(12) United States Patent
Chang et al.

(10) Patent No.: US 8,956,718 B2
(45) Date of Patent: Feb. 17, 2015

(54) TRANSPARENT CONDUCTOR THIN FILM FORMATION

(75) Inventors: Shih Chang Chang, Cupertino, CA (US); Lili Huang, San Jose, CA (US); Sueng Jae Hong, San Jose, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 876 days.

(21) Appl. No.: 12/488,432

(22) Filed: Jun. 19, 2009

(65) Prior Publication Data

US 2010/0323166 A1    Dec. 23, 2010

(51) Int. Cl.
*B32B 7/02* (2006.01)
*G06F 3/041* (2006.01)
*H01B 1/08* (2006.01)

(52) U.S. Cl.
CPC ............... *G06F 3/0412* (2013.01); *H01B 1/08* (2013.01); *G06F 2203/04103* (2013.01)
USPC ........... 428/212; 428/172; 428/203; 428/209; 427/58

(58) Field of Classification Search
CPC ................................ G06F 3/1012; H01B 1/08
USPC .................... 428/172, 203, 212, 209; 427/58; 345/173, 174
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,602,790 B2 | 8/2003 | Kian et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 2002/0041356 A1 | 4/2002 | Tanada et al. | |
| 2004/0165005 A1 | 8/2004 | Yoshikawa et al. | |
| 2004/0183076 A1 | 9/2004 | Yamazaki et al. | |
| 2006/0026521 A1 | 2/2006 | Hotelling et al. | |
| 2006/0097991 A1 | 5/2006 | Hotelling et al. | |
| 2006/0134431 A1 | 6/2006 | Yasuda et al. | |
| 2006/0197753 A1 | 9/2006 | Hotelling | |
| 2006/0279679 A1 | 12/2006 | Fujisawa et al. | |
| 2008/0129317 A1 | 6/2008 | Oba | |
| 2008/0165158 A1 | 7/2008 | Hotelling et al. | |
| 2009/0057625 A1 * | 3/2009 | Inaba et al. | 252/519.51 |
| 2009/0090694 A1 | 4/2009 | Hotelling et al. | |

FOREIGN PATENT DOCUMENTS

| | | | |
|---|---|---|---|
| JP | 2000-163031 A | 6/2000 | |
| JP | 2002-342033 A | 11/2002 | |
| WO | WO-2007/115032 A2 | 10/2007 | |
| WO | WO-2007/115032 A3 | 10/2007 | |
| WO | WO-2010/147783 A2 | 12/2010 | |

OTHER PUBLICATIONS

International Search Report mailed Mar. 11, 2011, for PCT Application No. PCT/US2010/037639, filed Jun. 7, 2010, four pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Ohsaki, H. et al. (Jul. 2, 2007). "Room temperature crystallization of indium tin oxide films on glass and plyethylene terephthalate substrates using rf plasma," Journal of Vacuum Science and Technology, Part A, AVS/AIP, Melville, NY, US. vol. 25, No. 4, four pages.

* cited by examiner

*Primary Examiner* — Aaron Austin
*Assistant Examiner* — Lawrence Ferguson
(74) *Attorney, Agent, or Firm* — Morrison & Foerster LLP

(57) ABSTRACT

Substantially transparent conductor layers in touch sensing systems may be formed by forming a barrier layer between an organic layer and a substantially transparent conductive layer. For example, a barrier layer can be formed over the organic layer, and the transparent conductor layer can be formed over the barrier layer. The barrier layer can reduce or prevent outgassing of the organic layer, to help increase the quality of the transparent conductor layer. In another example, a combination layer of two different types of a transparent conductor may be formed over the organic layer by forming a barrier layer of the transparent conductor, and forming a second layer of the transparent conductor on the barrier layer. Outgassing that can occur when forming the barrier layer can cause the transparent conductor of the barrier layer to be of lower-quality, but can result in a higher-quality transparent conductor of the second layer.

11 Claims, 23 Drawing Sheets

TRANSPARENT CONDUCTOR THIN FILM FORMATION

FIELD

This relates generally to substantially transparent conductor layers in touch sensing systems, and in particular, to forming a barrier layer between an organic layer prior to forming a substantially transparent conductive layer.

BACKGROUND

Substantially transparent conductors (also referred to herein simply as "transparent conductors" or "transparent conductive materials") are electrically conductive materials that can be substantially transparent to light when formed, for example, as a thin film. Because of their combination of optical and electrical properties, thin films of substantially transparent conductors have found uses in a variety of products, such as liquid crystal displays, touch screens, anti-static coatings, solar cells, etc. In some applications, a thin film of transparent conductor can be formed as a layer in a stack up of multiple layers of materials including, for example, semiconductor layers, insulating layers, metal layers, etc. Organic layers, i.e., layers formed of organic material, can also be used in some stack ups. Organic layers are typically insulating layers that can be formed by a mechanical application of the organic material to the surface of a stack up, e.g., coating. In some applications, an organic insulating layer may be a lower cost alternative to an inorganic insulating layer, which may require slower and more expensive methods to form the layer, such as epitaxial growth.

In some conventional applications, such as some conventional LCD displays, transparent conductor thin films may be deposited on stack ups that include organic layers. In these applications, the high temperatures that can be required to form some transparent conductor thin films, such as Indium Tin Oxide (ITO), can cause outgassing from the organic material, i.e., the releasing of gas that was trapped inside the organic material into the surrounding environment. In conventional applications that use both ITO and organic layers, outgassing during ITO thin film formation does not pose problems. However, newer technologies may require higher-quality ITO thin films that can be more difficult to form if outgassing of organic layers is occurring.

SUMMARY

This relates to substantially transparent conductor layers in touch sensing systems, and in particular, to forming a barrier layer between an organic layer and a substantially transparent conductive layer. In one example embodiment, a transparent conductor layer on a touch sensor panel stackup including an organic layer can be formed by forming a barrier layer over the organic layer, and forming the transparent conductor layer over the barrier layer. The barrier layer can reduce or prevent outgassing of the organic layer during the formation of the transparent conductor layer, for example, by preventing gases from the organic layer from entering the environment.

In another example embodiment, a transparent conductor layer may be formed by forming a barrier layer of the transparent conductor over the organic layer, and forming a second layer of the transparent conductor on the barrier layer. In this way, for example, a combination layer of two different types of transparent conductor may be formed, because outgassing of the organic layer that can occur during the formation of the barrier layer can cause the transparent conductor of the barrier layer to be of lower-quality than the transparent conductor of the second layer. In other words, the barrier layer can reduce or prevent outgassing during the formation of the second layer, which can result in a higher-quality transparent conductor of the second layer.

BRIEF DESCRIPTION OF THE DRAWINGS

The present disclosure, in accordance with one or more various embodiments, is described in detail with reference to the following figures. The drawings are provided for purposes of illustration only and merely depict example embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION

Figure 1C:
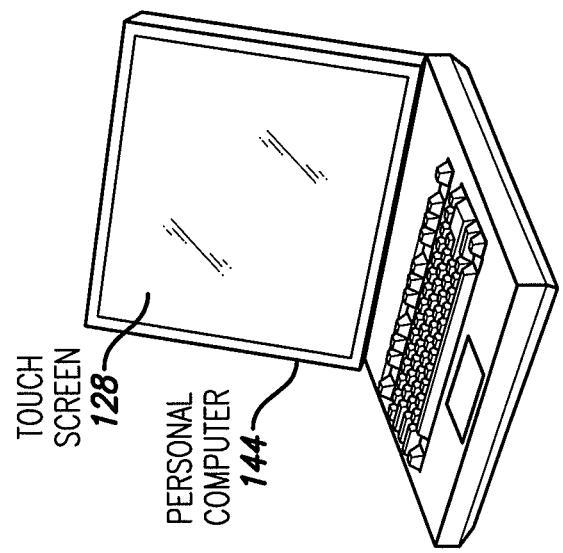
FIGS. 1A-1C illustrate an example mobile telephone, an example digital media player, and an example personal computer that each include an example touch screen.

In the following description of embodiments, reference is made to the accompanying drawings which form a part hereof, and in which it is shown by way of illustration specific embodiments that can be practiced. It is to be understood that other embodiments can be used and structural changes can be made without departing from the scope of the disclosed embodiments.

In some touch sensor panels it may be desirable to provide electrical connectivity using two types of conductive material for different purposes, such as ITO in areas of desired transparency and metal in areas where transparency is not required. In some instances the two types of conductive material may be insulated from each other, except for intended interconnection points, using an electrically insulating layer. An organic layer can serve as the insulating layer between an underlying conductive material (e.g., metal) and an overlaid conductive material (e.g., ITO), although the order of the two materials can also be reversed.

Embodiments of the disclosure relate generally to substantially transparent conductor layers in touch sensing systems, and in particular, to forming a barrier layer between an organic layer and a substantially transparent conductive layer. The barrier layer can reduce or prevent outgassing of the organic layer during the subsequent formation of the transparent conductor layer, for example, by preventing gases from the organic layer from entering the environment. A transparent conductor layer formed in such an environment can be of higher-quality, e.g., have better optical and/or electrical properties, than a transparent conductor layer formed in an environment in which outgassing occurs unchecked. A higher-quality transparent conductor layer may be of particular benefit in some applications, such as newer touch screen designs. For example, it may be desirable for ITO layers in the viewing area, i.e., the area of the touch screen that displays images visible to a user, to be formed of high-quality crystalline ITO.

Touch screen technology is one example of a technology that may benefit from higher-quality transparent conductor layers deposited on stack ups that include organic materials. Touch screens can include a transparent touch sensor panel positioned in front of a display device such as an LCD, or can include an integrated touch screen in which touch sensing circuitry is partially or fully integrated into a display, etc. Touch screens can allow a user to perform various functions by touching the touch screen using a finger, stylus or other object at a location that may be dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Mutual capacitance touch sensor screens, for example, can be formed from a matrix of drive and sense lines of a transparent conductive material such as ITO, often arranged in rows and columns in horizontal and vertical directions on the viewing area of a substantially transparent stack up. Although ITO is used below as one example transparent conductive material, other transparent conductive materials could be used. Drive signals can be transmitted through the drive lines, which can result in the formation of static mutual capacitance at the crossover points or adjacent areas (sensing pixels) of the drive lines and the sense lines. The static mutual capacitance, and any changes to the static mutual capacitance due to a touch event, can be determined from sense signals that can be generated in the sense lines due to the drive signals.

The drive and sense lines formed in the viewing area of a touch screen may be visible in some touch screen designs. Therefore, in some touch screen designs, the optical quality of the ITO can be important. In addition, in some touch screen designs, the layout of the drive and sense lines and touch sensing scheme used to detect touch may be more sensitive to the electrical qualities of the ITO. In these and other applications, a barrier layer that reduces outgassing of organic layers during the formation of ITO layers may be of particular benefit due to the potentially increased optical and/or electrical qualities of the resulting ITO layers. A barrier layer between an organic layer and a transparent conductor layer may also provide other advantages, such as providing a more rigid under layer for the ITO layer, and improving optical quality, step coverage, thermal endurability, and electrical conductivity. The barrier layer may also help to mitigate mismatches in thermal conductivity of the organic material and the ITO, and may help to reduce a scratch risk of the stackup.

Figure 1B:
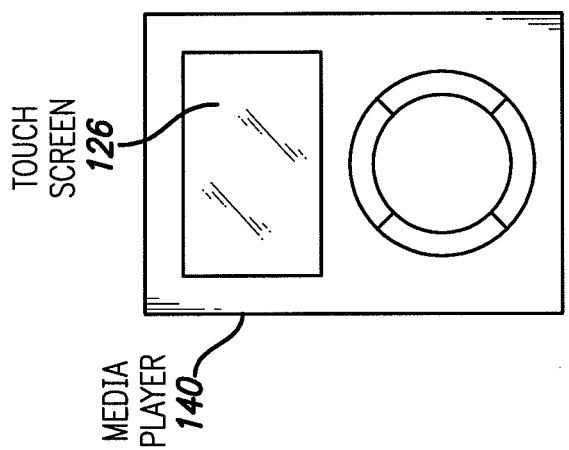
Figure 1A:
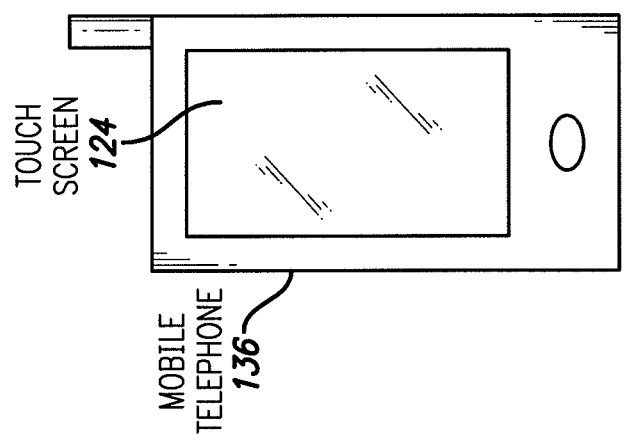

Some of the potential advantages of various embodiments of the invention, such as thinness, brightness, and power efficiency, may be particularly useful for portable devices, though use of embodiments of the invention is not limited to portable devices. FIGS. 1A-1C show example systems in which an integrated touch screen according to embodiments of the invention may be implemented. FIG. 1A illustrates an example mobile telephone 136 that includes an integrated touch screen 124. FIG. 1B illustrates an example digital media player 140 that includes an integrated touch screen 126. FIG. 1C illustrates an example personal computer 144 that includes an integrated touch screen 128.

Figure 2:
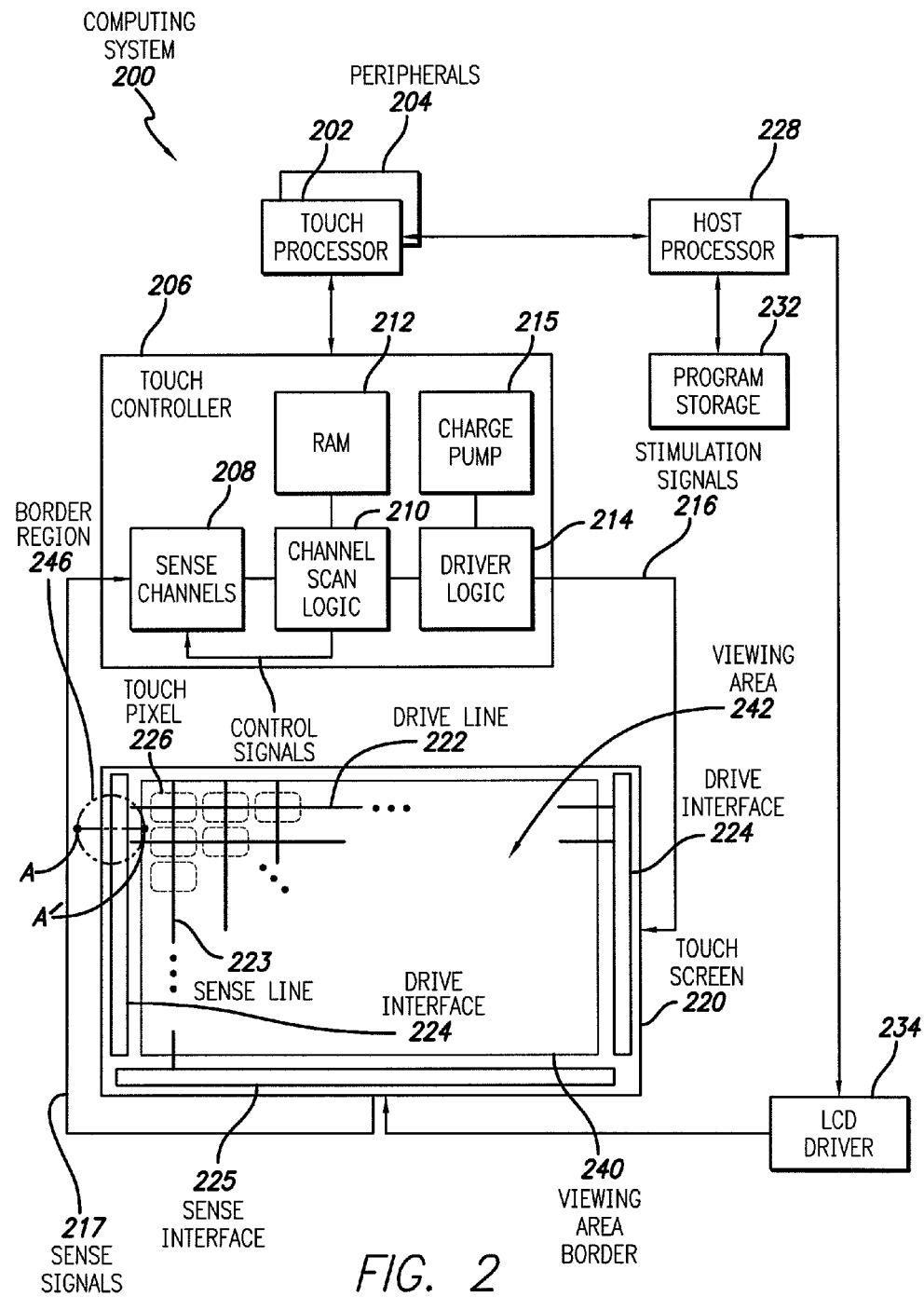
FIG. 2 is a block diagram of an example computing system that illustrates one implementation of an example touch screen.

FIG. 2 is a block diagram of an example computing system 200 that illustrates one implementation of an example touch screen 220 with a barrier layer. Computing system 200 could be included in, for example, mobile telephone 136, digital media player 140, personal computer 144, or any mobile or non-mobile computing device that includes a touch screen. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and phases that can be selectively applied to drive regions of the touch sensing circuitry of touch screen 220, as described in more detail below. In some embodiments, touch controller 206, touch processor 202 and peripherals 204 can be integrated into a single application specific integrated circuit (ASIC).

Computing system 200 can also include a host processor 228 for receiving outputs from touch processor 202 and performing actions based on the outputs. For example, host processor 228 can be connected to program storage 232 and a display controller, such as an LCD driver 234. Host processor 228 can use LCD driver 234 to generate an image on touch screen 220, such as an image of a user interface (UI), and can use touch processor 202 and touch controller 206 to detect a touch on or near touch screen 220, such a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Touch screen 220 can include touch sensing circuitry that includes a capacitive sensing medium having a plurality of drive lines 222 and a plurality of sense lines 223. It should be noted that the term "lines" is a sometimes used herein to mean simply conductive pathways, as one skilled in the art will readily understand, and is not limited to structures that are strictly linear, but includes pathways that change direction, and includes pathways of different size, shape, materials, etc. One or both of the plurality of drive lines 222 and the plurality of sense lines 223 can be formed of ITO layers. Drive lines 222 can be driven by stimulation signals 216 from driver logic 214 through a drive interface 224, and resulting sense signals 217 generated in sense lines 223 are transmitted through a sense interface 225 to sense channels 208 (also referred to as an event detection and demodulation circuit) in touch controller 206. In this way, drive lines and sense lines are part of the touch sensing circuitry that can interact to form capacitive sensing nodes, which can be thought of as touch picture elements (touch pixels), such as touch pixel 226. Drive interface 224, sense interface 225, and other circuitry (not shown) are positioned behind a viewing area border 240, which hides these elements from view while leaving touch pixels 226 and corresponding portions of drive lines 222 and sense lines 223 exposed to view in a viewing area 242.

Figure 3:
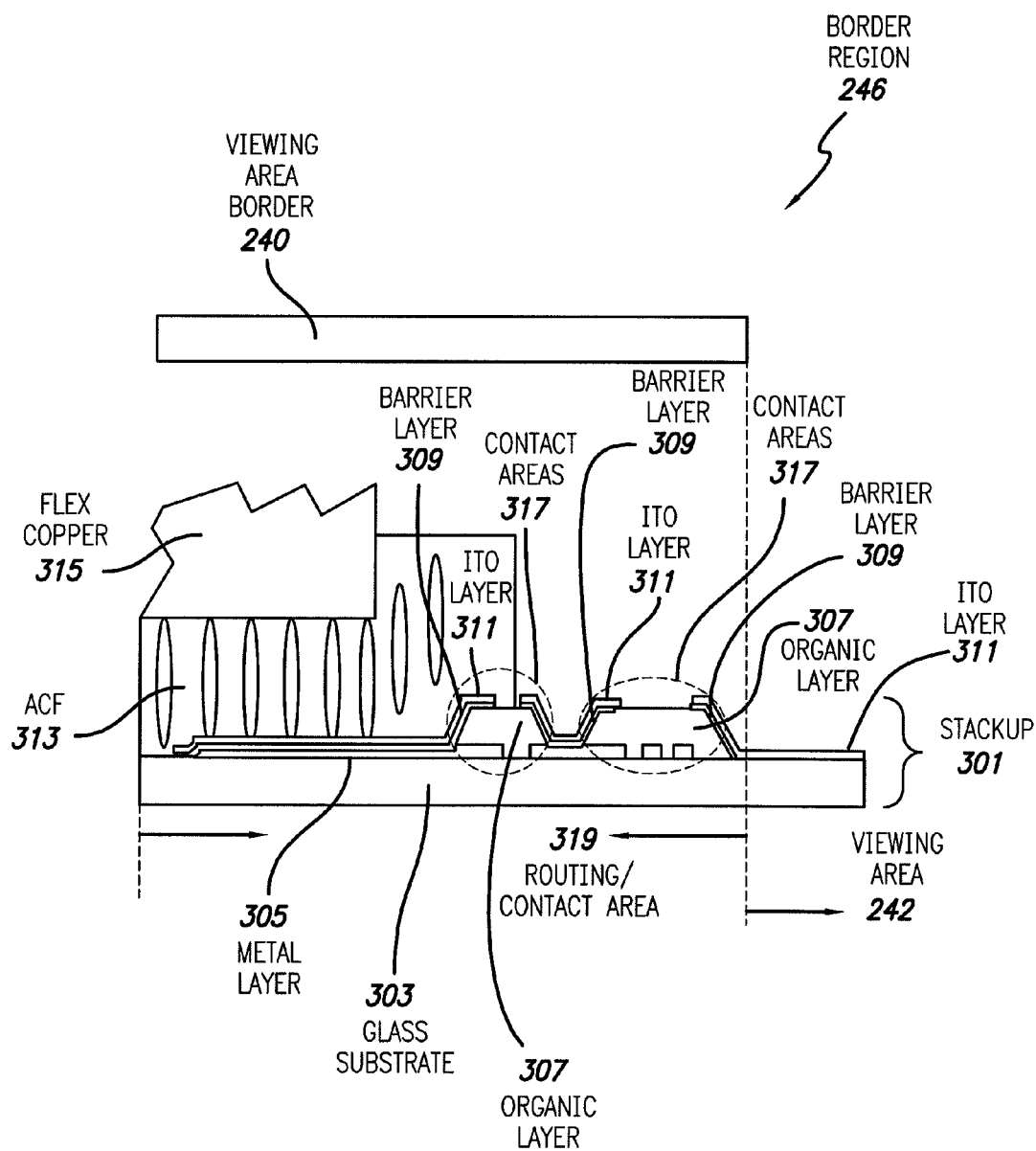
FIG. 3 is a cross section view showing a detail of the example computing system of FIG. 2, including a barrier layer between an organic layer and a transparent conductor layer according to embodiments of the disclosure.

FIG. 3 shows a more detailed view of a border region 246 region of touch screen 220. FIG. 3 is a cross section view of border region 246 taken along the line A-A' in FIG. 2, which shows a portion of a stack up 301 of touch screen 220 in the border region. Stack up 301 includes a glass substrate 303, a metal layer 305, an organic layer 307, a barrier layer 309, and an ITO layer 311. Touch screen also includes an anisotropic conductive film (ACF) 313 that can bond stackup 301 to a flexible copper connector 315 that can connect to drive interface 224 (not shown in FIG. 3). Stack up 301 can include contact areas 317 at which electrical contacts may be formed between ITO layer 311 and metal layer 305. Contact areas 317 can be positioned behind viewing area border 240 in a routing/contact area 319. Part of ITO layer 311 extends from contact areas 317 in routing/contact area 319 to viewing area 242 to form drive lines 222, for example.

Barrier layer 309 can reduce or prevent the affect of organic layer outgassing on ITO layer 311. In contrast, without barrier layer 309, a single ITO layer may be formed that contacts metal layer though the organic layer, but in this case, the ITO quality can be strongly dependent on the organic layer's physical, chemical, and/or thermal properties. In some applications utilizing ITO, in order to achieve desired electrical conductivity and optical requirements, i.e. low sheet resistance, such as 100-200 ohm/sq, and thin film thickness, such as 200 A or thinner, the ITO layer may have to be deposited at an elevated temperature, which could be higher than the temperature that the organic layer can endure. In such cases, organic outgassing or decomposing/chemical reaction due to high temperature and coupled with ion bombardment during sputtering may induce poor ITO quality, and the organic layer itself may be damaged as well.

In the present example, barrier layer 309 can be formed over most of routing/contact area 319, including covering organic layer 307, but not extending into viewing area 242. In the present example embodiment, barrier layer 309 is formed directly on organic layer 307, and ITO layer 311 is formed directly on barrier layer 309. However, in some embodiments the barrier layer may not be formed directly on the organic layer, but may be formed in another location that can reduce or prevent outgassing of the organic layer. Likewise, in the present example embodiment, ITO layer 311 is formed directly on barrier layer 309, but in some embodiments the barrier layer may be formed at another location.

FIGS. 4-8 describe an example embodiment in which barrier layer 309 is formed of a conductive material that does not extend into viewing area 242. FIGS. 9-13 show an example embodiment in which barrier layer 309 is formed of an inorganic dielectric material that does not extend into viewing area 242. FIGS. 14-18 show an example embodiment in which barrier layer 309 is formed of an organic material that does not extend into viewing area 242. FIGS. 19-23 show an example embodiment in which barrier layer 309 is formed of an transparent conductor that extends into viewing area 242.

Figure 4:
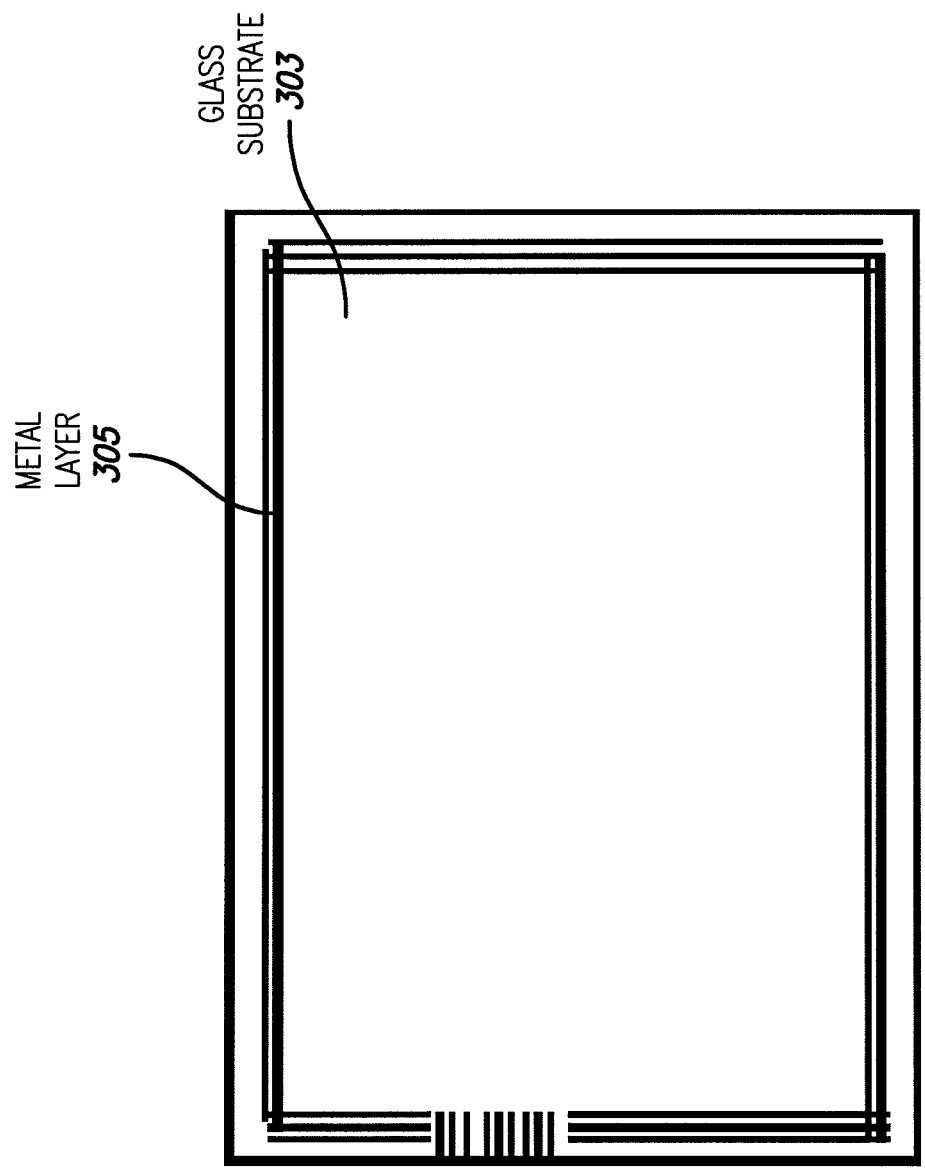
FIGS. 4-8 illustrate an example process of forming a barrier layer according to embodiments of the disclosure.
Figure 5:
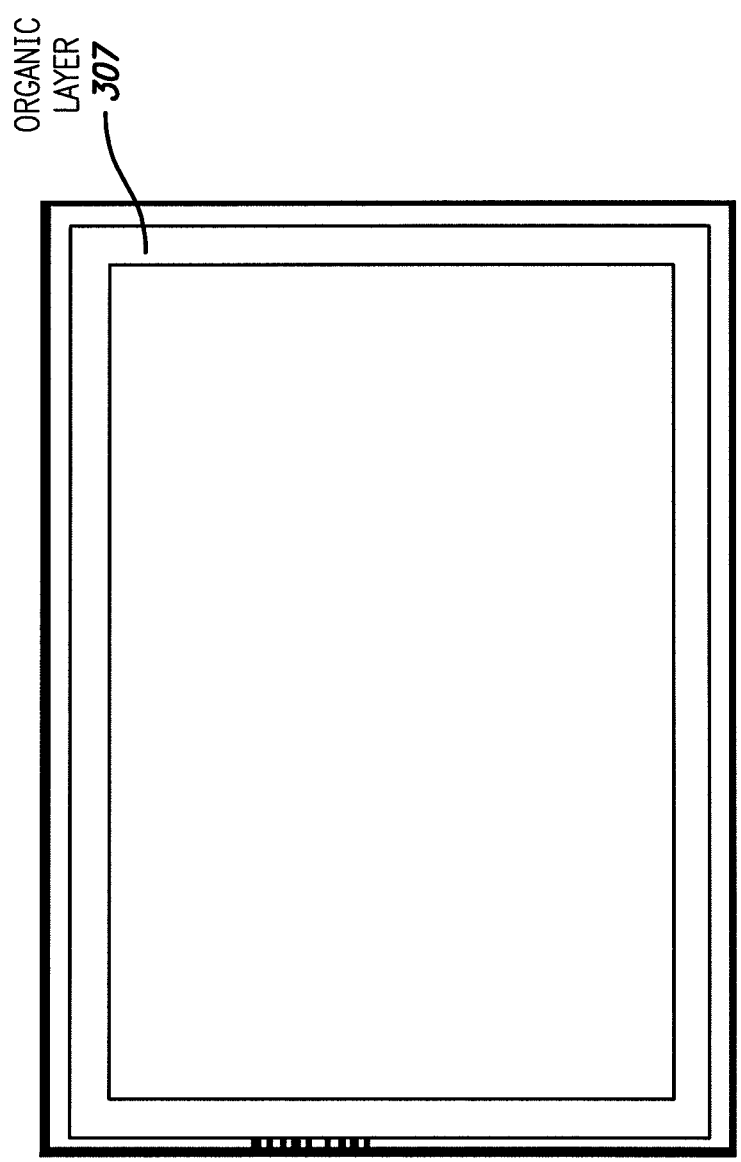
Figure 6:
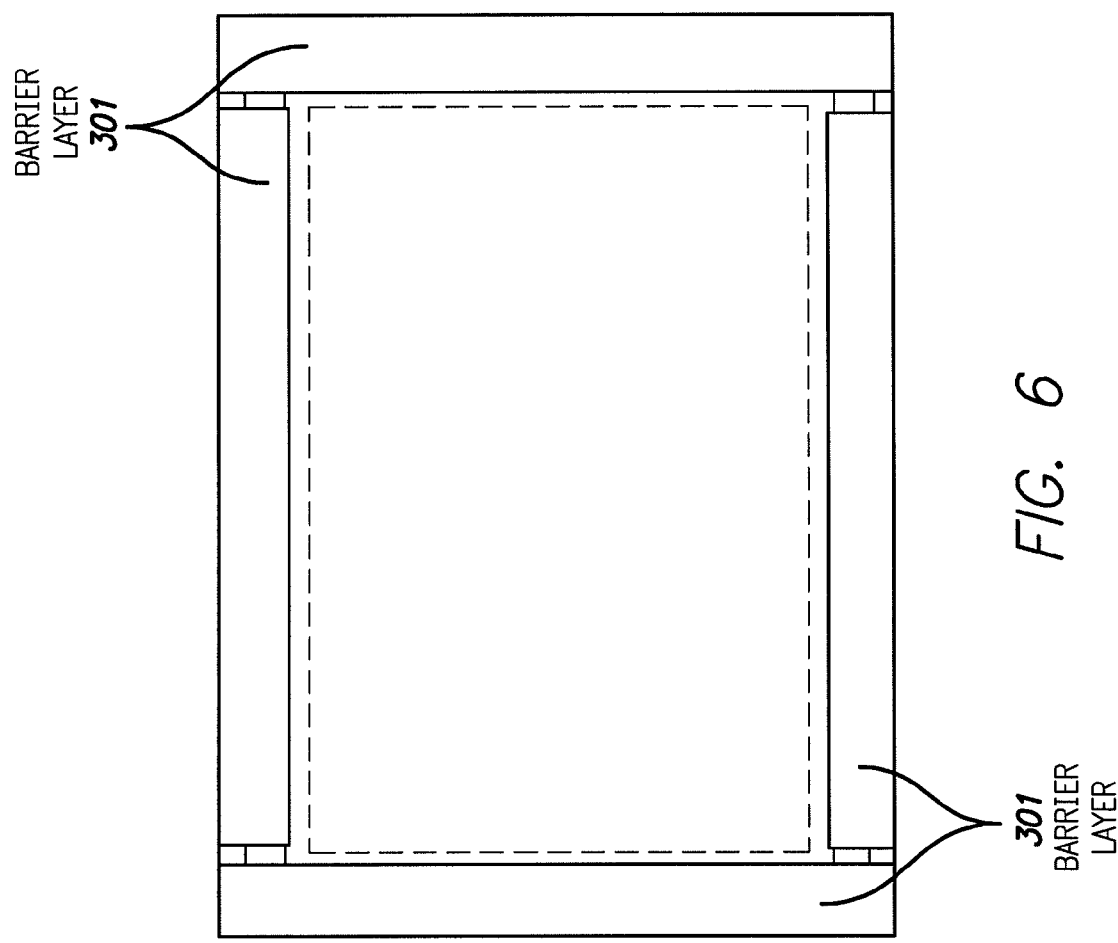

FIG. 4 shows the patterning of metal layer 305 on glass substrate 303. FIG. 5 shows organic layer 307 covering metal layer 305. FIG. 6 shows barrier layer 309, which in this example is formed of ITO. Barrier layer 309 is deposited to substantially cover routing/contact area 319, and consequently covers substantially all of organic layer 307. Barrier layer 309 does not extend into viewing area 242. The patterning of barrier layer 309 formed of ITO in this example can be accomplished by techniques such as masking with a photoresist, using a shadow mask, etc. Referring to the first example embodiment FIGS. 4-7 can illustrate steps of an example process of forming a barrier layer 309 using a conductive material. In this example, a variety of different conductive materials may be used. Although in the present example, ITO is the conductor that is used for barrier layer 309, non-transparent conductors may be used. In particular, in this example, the barrier layer is formed in the border region 246 and, therefore, would be hidden from view by viewing area border 240. An example of conductive materials that may be included molybdenum (Mo) materials, conductive transparent oxides (CTO), zinc oxides, titanium oxides, indium zinc oxides, carbon nanotubes, conductive organic polymers, etc.

While it may be desirable to form high-quality ITO in ITO layer 311 in the viewing area 242, the ITO formed in barrier layer 309 may not need to be high-quality ITO. For example, the ITO of barrier layer 309 is hidden from view by viewing area border 240. Because ITO barrier layer 309 will not be seen, the optical qualities need not be high. However, the electrical qualities of the ITO of barrier layer 309 may need to be high in order to provide a good electrical connection between high-quality ITO layer 311 and metal layer 305. In addition, ITO barrier layer 309 may need to have good mechanical properties to provide a firm foundation for the portion of high-quality crystalline ITO layer 311 to be formed on the barrier layer. A firm foundation can allow a thinner high-quality ITO layer 311 to be formed, thereby improving optical qualities of the high-quality ITO layer in viewing area 242. For example, in some embodiments including an ITO barrier layer, the ITO of the barrier layer may be deposited thicker on the organic layer in order to reduce the amount of mechanical strain that can reach ITO layer 311 due to thermal expansions and contractions of the organic layer. This can also help to allow ITO layer 311 to be thinner. In contrast, the ITO of barrier layer 309 can be hidden from view, as in the present example embodiment. In this case, making ITO barrier layer 309 thicker, and hence reducing the layer's optical quality, should not affect the performance of touch screen 220.

In some embodiments, forming barrier layer 309 on routing/contact area 319 but not on viewing area 242 may be accomplished with by masking the viewing area with a photoresist, for example. In other embodiments, a shadow mask positioned over the viewing area may be used to block sputtered, vaporized, etc., ITO from being deposited in the viewing area. A shadow mask can be a physical barrier that blocks sputter from depositing on the viewing area but allows the sputter to deposit on the routing/contact area. The shadow mask can be removed when the barrier layer is thick enough to sufficiently reduce outgassing.

Figure 7:
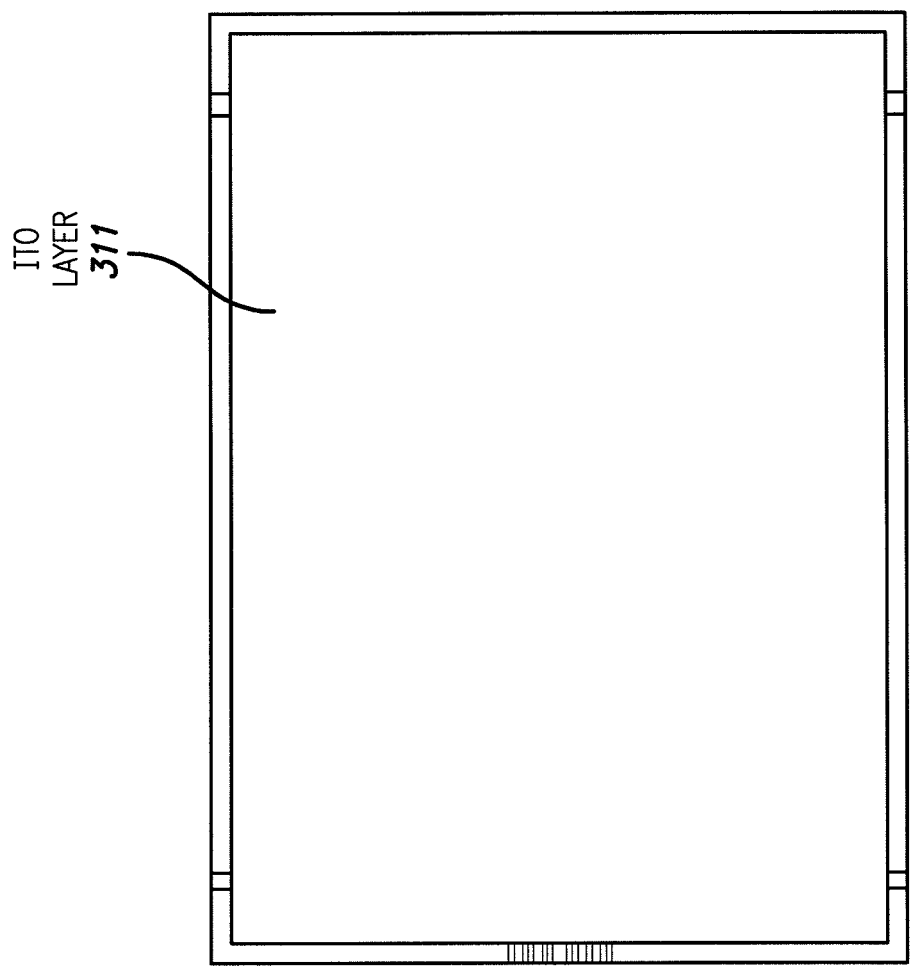

FIG. 7 shows ITO layer 311 deposited over substantially the entire surface of the stack up 301. As described above, ITO layer 311 may be deposited by processes such as physical vapor deposition, chemical vapor deposition, etc. It should be noted that if barrier layer 309 was absent, the ITO deposited in viewing area 242 can be affected by the outgassing of organic layer 307 even though the ITO in the viewing area is not formed directly on the organic layer, and in fact is distant from the organic layer. This is because outgassing from the organic layer results in gases being released into the environment around the organic layer, which can include areas of stackup 301 that are distant from the organic layer. Because a layer of ITO has already been deposited over organic layer 307 to form barrier layer 309, outgassing of the organic layer is reduced. Therefore, higher temperature methods may be used for depositing ITO layer 311, which can result in a high-quality crystalline ITO. This high-quality crystalline ITO layer 311 can be deposited in viewing area 242.

After the high-quality ITO layer 311 is deposited as shown in FIG. 7, the portion of ITO layer 311 in routing/contact area 319 and lower-quality ITO layer (barrier layer 309) might be fabricated as two separate layers, or may be fabricated as a single layer of ITO in which the quality of the ITO can be different at different distances through the thickness of the layer. In other words, barrier layer 309 and ITO layer 311 may be fabricated as a combination layer including different types of ITO. In contrast, the portion of high-quality ITO layer 311 formed in viewing area 242 can be a single type of ITO, such as high-quality crystalline ITO. Although in this example embodiment, barrier layer 309 is formed of lower quality ITO (e.g., at low temperature), barrier layer 309 can be formed of the same high-quality ITO as ITO layer 311, for example. In other words, a first deposition of ITO can be made to deposit a particular quality ITO as barrier layer 309. The deposition would proceed until enough ITO had been deposited to form an effective barrier to outgassing by organic layer 307. The environment surrounding stackup 301 can be cleaned, for example, by flooding the deposition chamber with an inert gas to remove gases from the outgassing of organic layer 307. For some embodiments, in which ITO is deposited under vacuum, the deposition process may simply pause after a desired thickness of barrier layer 309 is achieved. During the pause, the vacuum in the deposition chamber can be maintained to draw away gases from the outgassing of organic layer 307. When enough of gases have been removed, the deposition of high-quality ITO can resume in a second stage. In the second stage, the environment surrounding stackup 301 may be sufficiently cleaned of outgassed gases that a high-quality crystalline ITO may be formed in the second stage.

Figure 8:
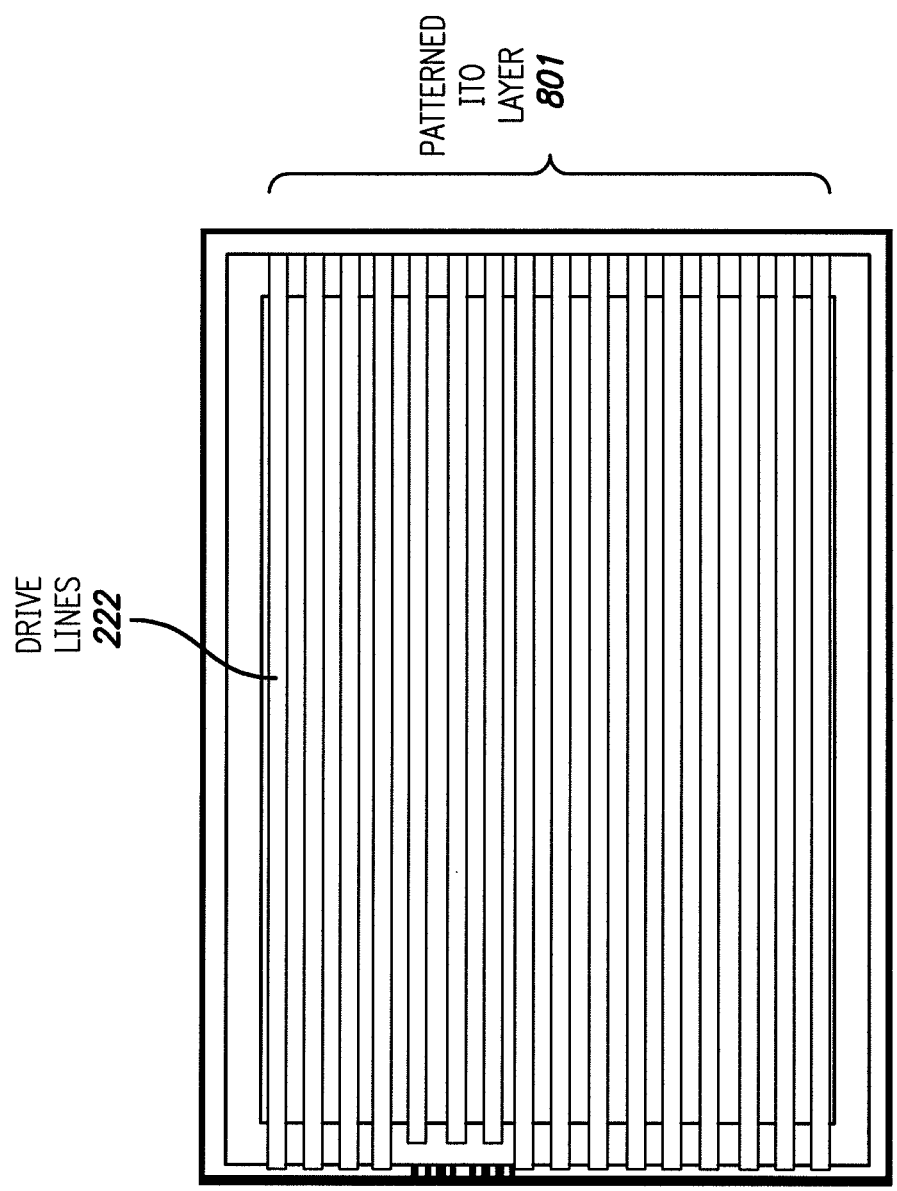

FIG. 8 shows patterned ITO 801 resulting from masking and etching steps to form drive lines 222 as rows of ITO layer 311. Masking and etching steps need only be applied once because both ITO layer 311 and barrier layer 309 are layers of ITO, even though the quality of the two layers may differ. In other words, barrier layer 309 and ITO layer 311 can be patterned simultaneously.

Figure 9:
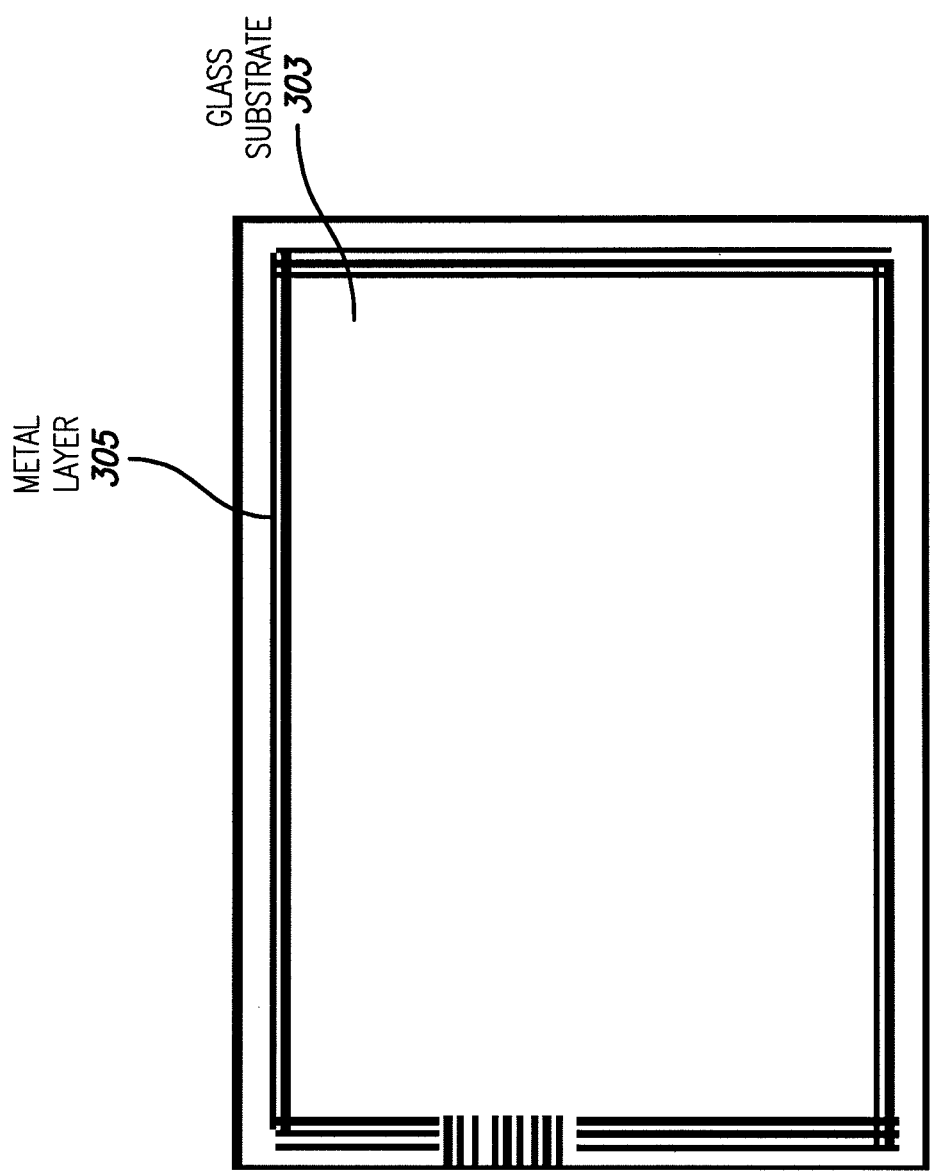
FIGS. 9-13 illustrate another example process of forming a barrier layer according to embodiments of the disclosure.
Figure 10:
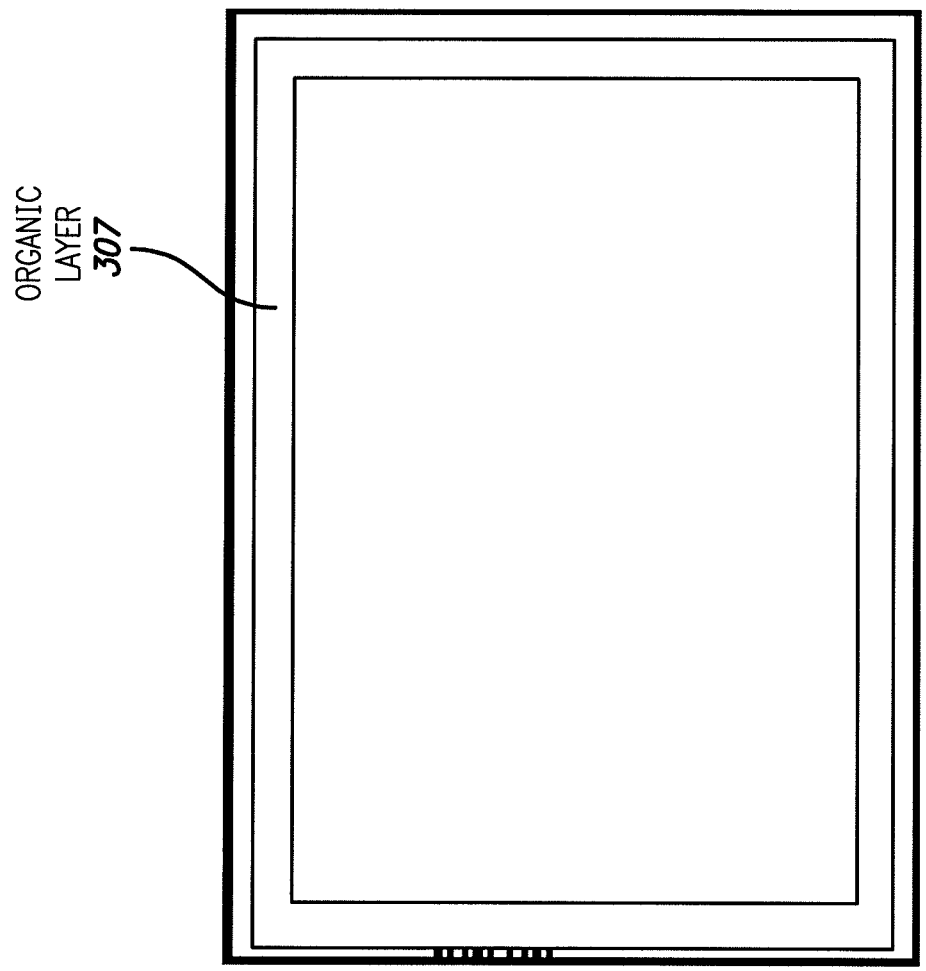
Figure 11:
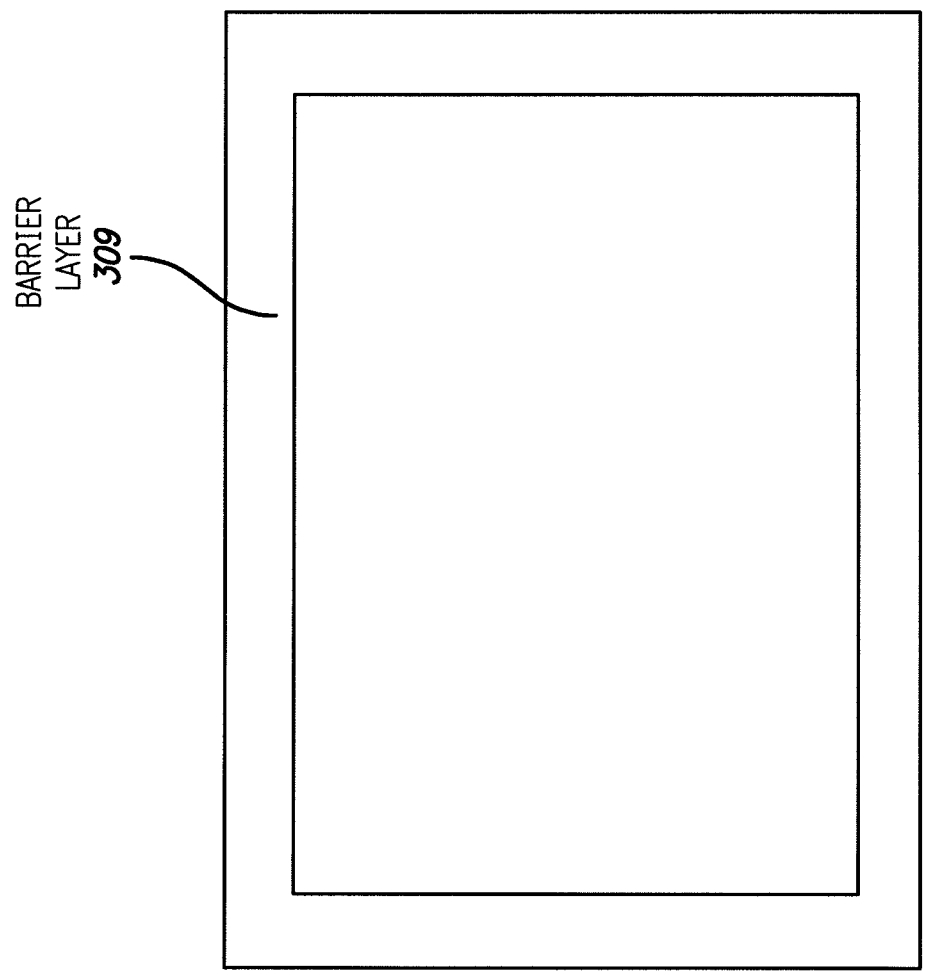

FIGS. 9-13 illustrate another example embodiment in which barrier layer 309 can be formed from a dielectric material. FIG. 9 shows the patterning of metal layer 305 on glass substrate 303. In this example, metal layer 305 may be the same as the metal layer in the previous example. FIG. 10 shows the formation of organic layer 307. FIG. 11 shows the formation of barrier layer 309 formed of the dielectric material. As in the previous example, barrier layer 309 covers organic layer 307 as it is deposited over most of routing/contact area 319. Likewise, barrier layer 309 does not extend into viewing area 242. Dielectric barrier layer 309 may be formed by, for example, masking viewing area 242, and performing a physical vapor deposition to deposit the dielectric material onto routing/contact area 319 to form their barrier layer 309. Because dielectric barrier 309 is not conductive, contact holes must be patterned and opened in barrier layer 309, to provide a pathway through the dielectric for ITO layer 311 to contact metal layer 305.

Figure 12:
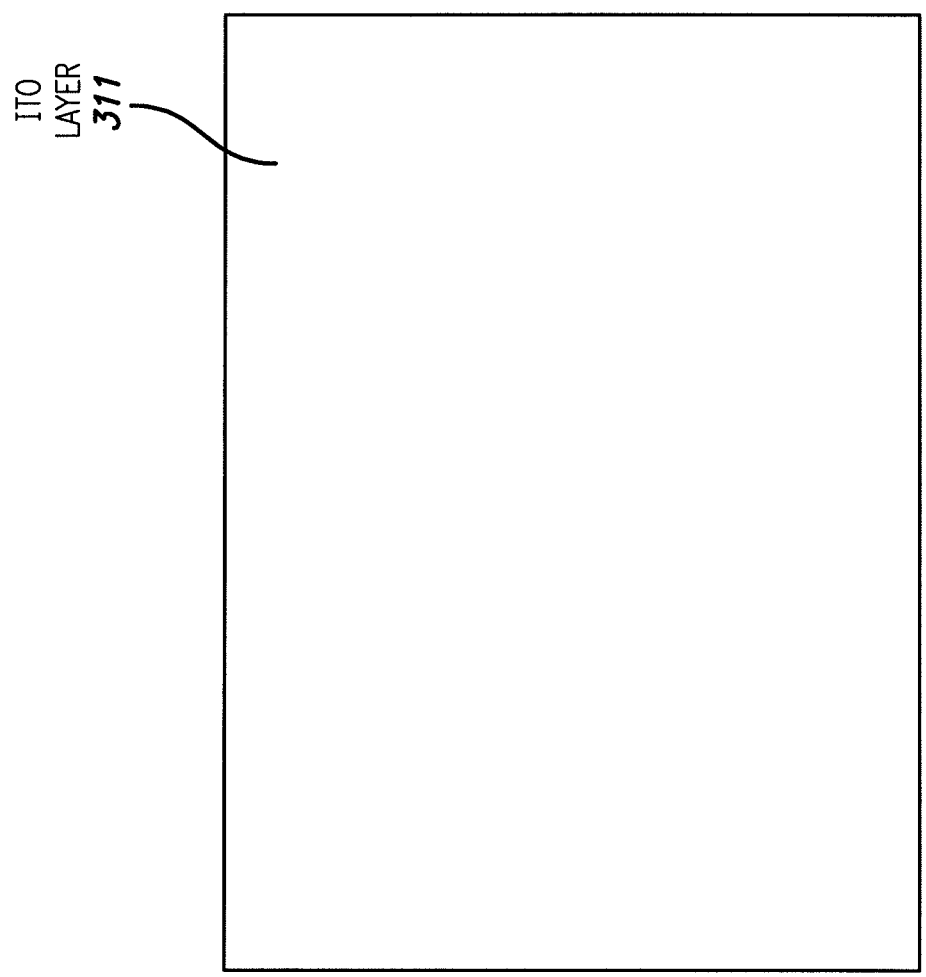
Figure 13:
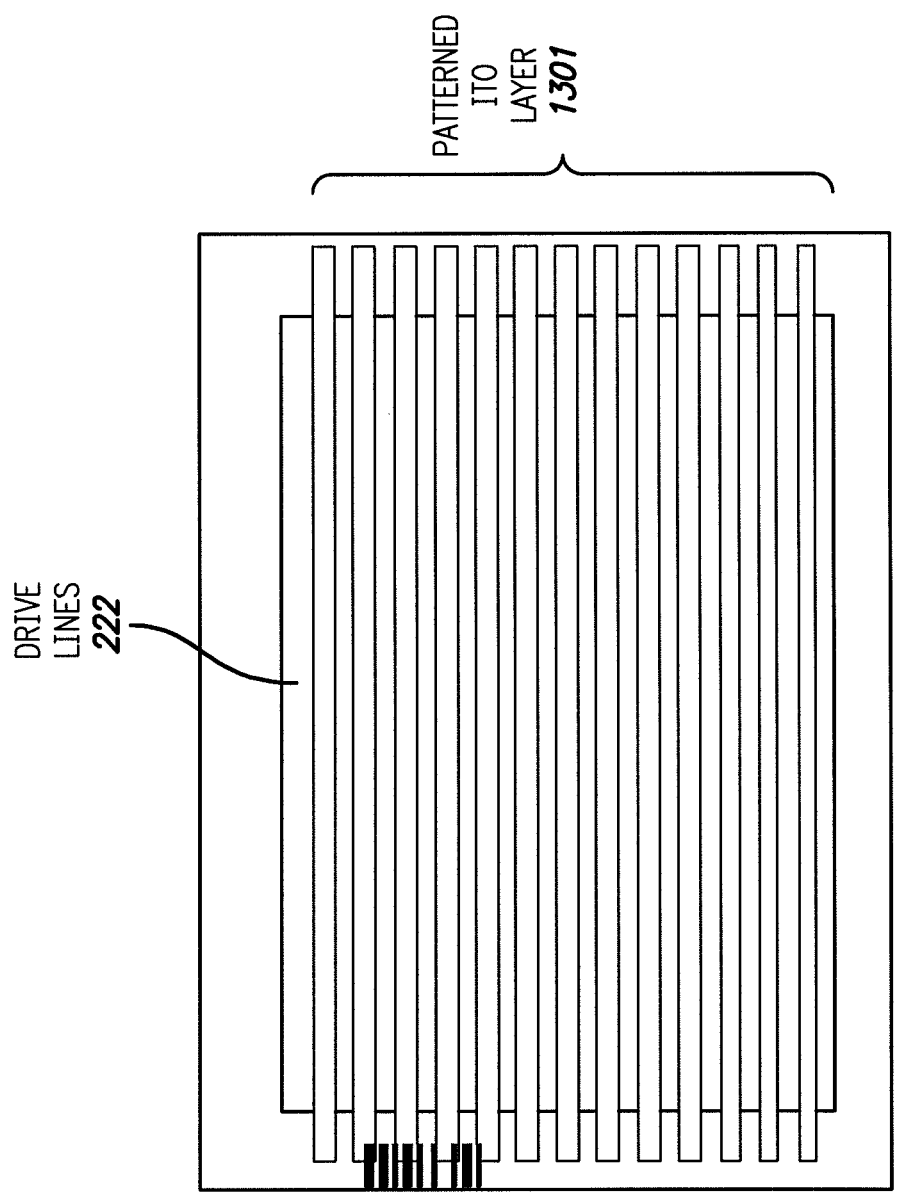

FIG. 12 shows ITO layer 311 deposited over substantially over the entire surface of the stackup 301. As in the previous example, the ITO layer 311 can be formed using higher temperature processes because dielectric barrier layer 309 can reduce or prevent outgassing of organic layer 307 caused by higher temperatures. FIG. 13 shows the results of masking and etching steps that result in a patterned ITO layer 1301. Similar to the patterning of ITO layer 311 in the previous example shown in FIG. 8, patterned rows of ITO layer form drive lines 222. However, unlike the previous example, the masking and etching steps do not remove barrier layer 309 formed of a dielectric material. Instead, barrier layer 309 remains as a cover for organic layer 307.

Figure 14:
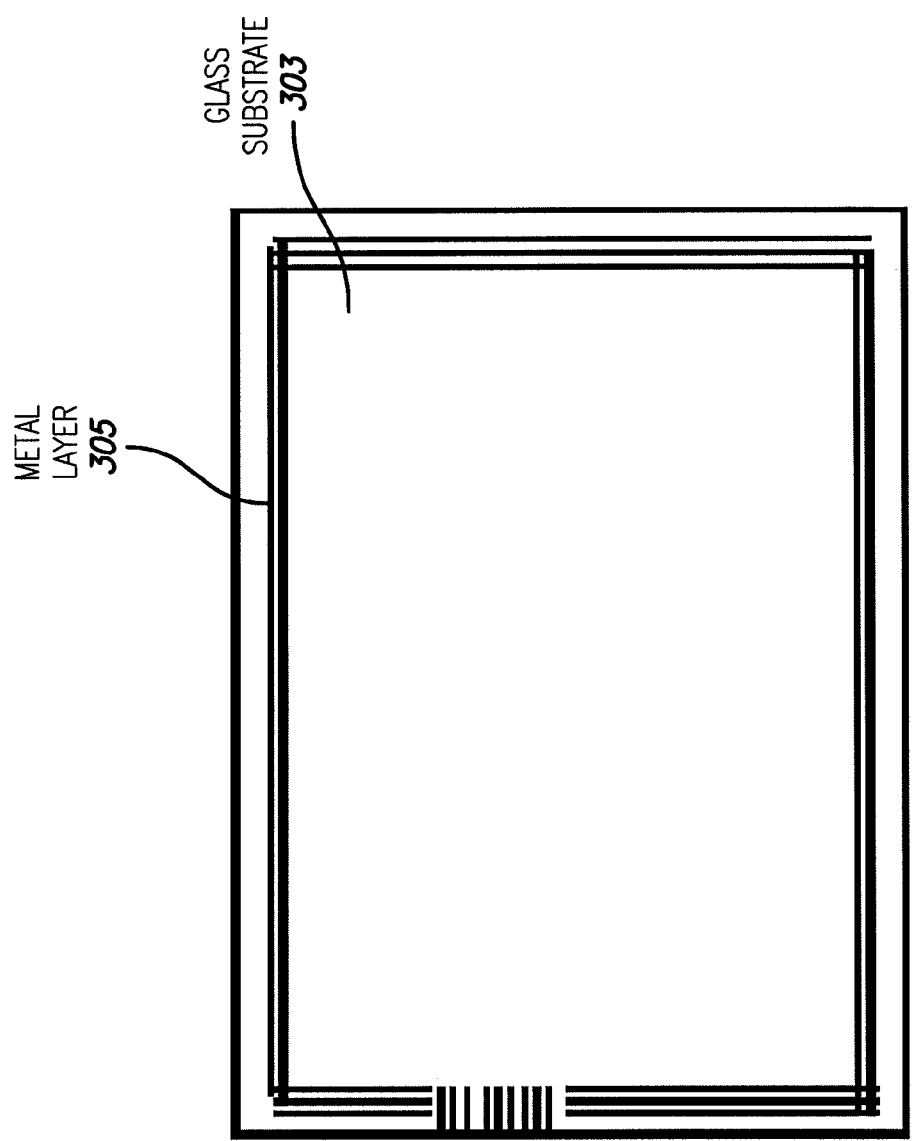
FIGS. 14-18 illustrate another example process of forming a barrier layer according to embodiments of the disclosure.
Figure 15:
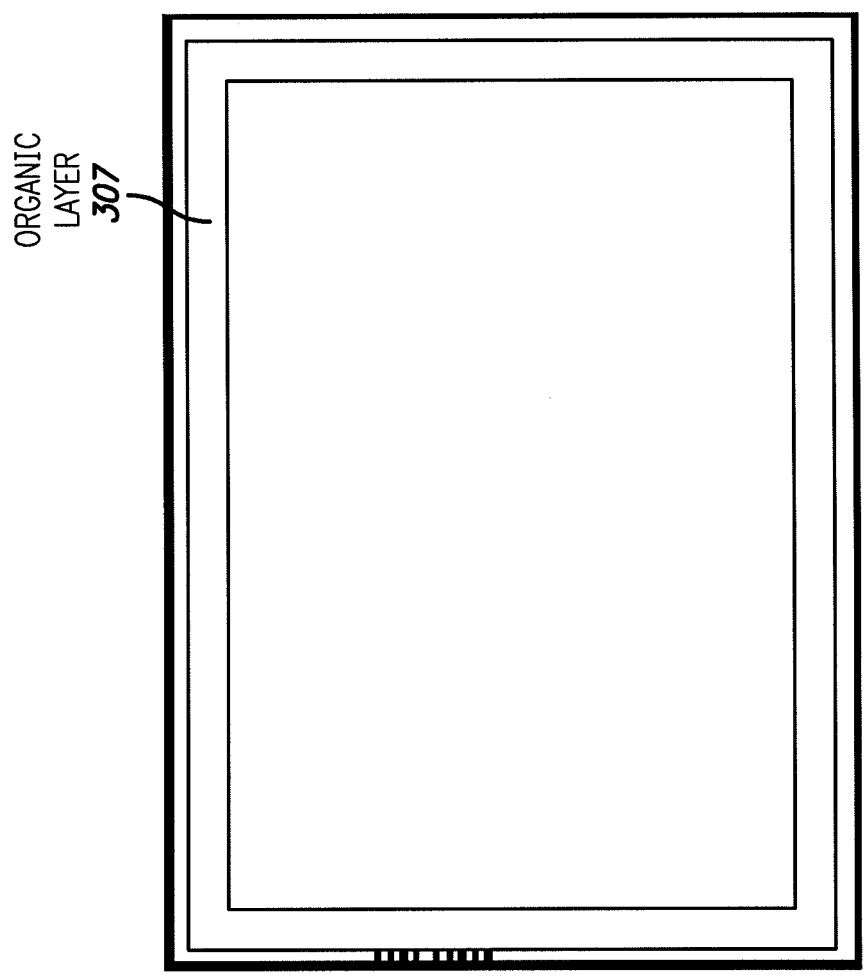
Figure 16:
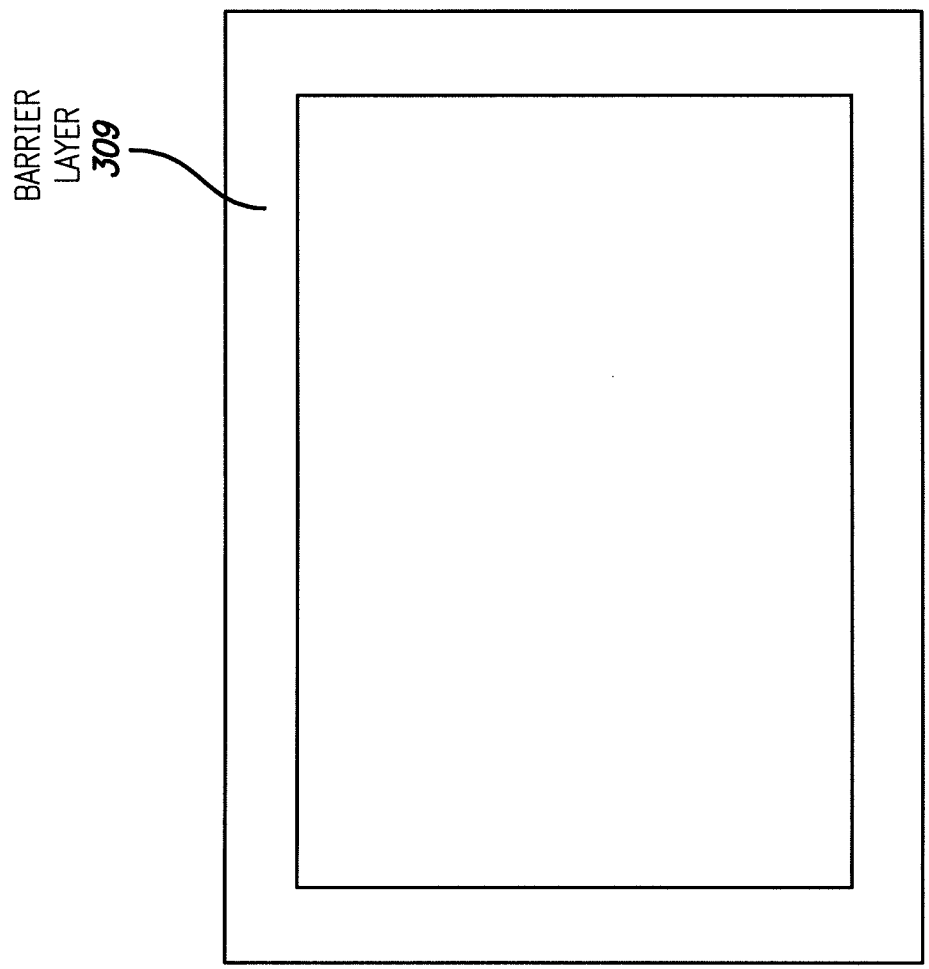
Figure 17:
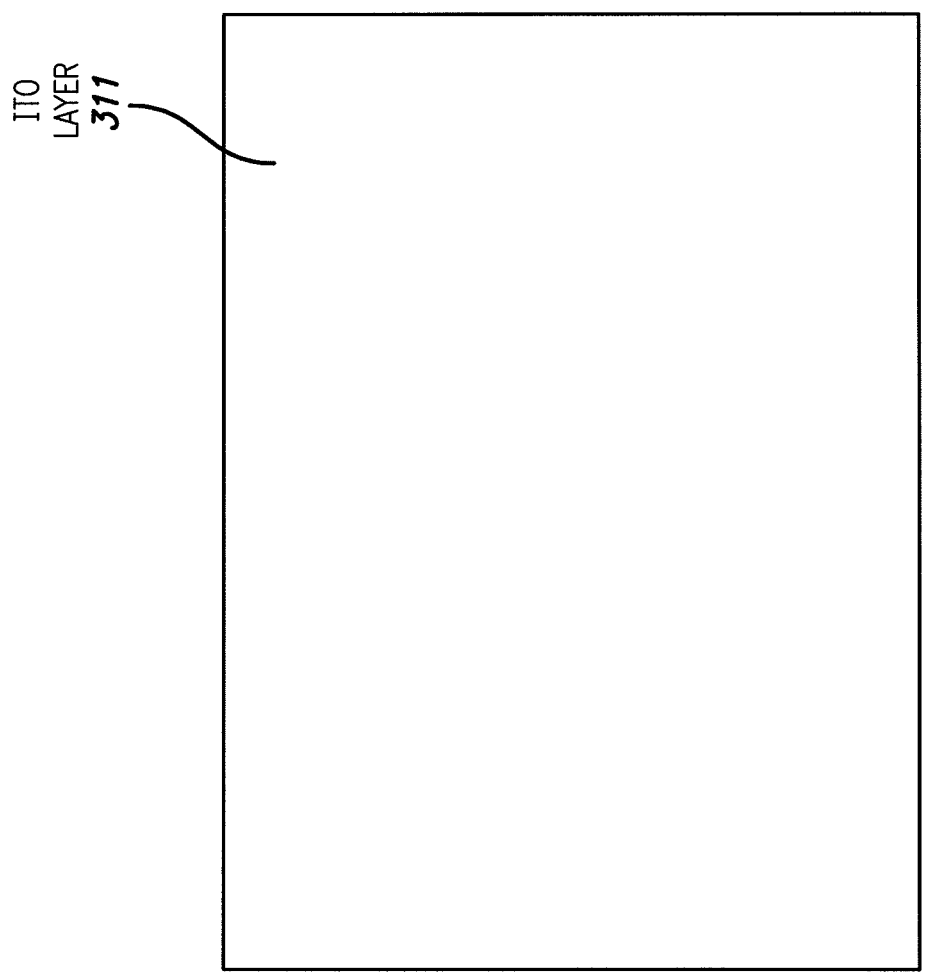
Figure 18:
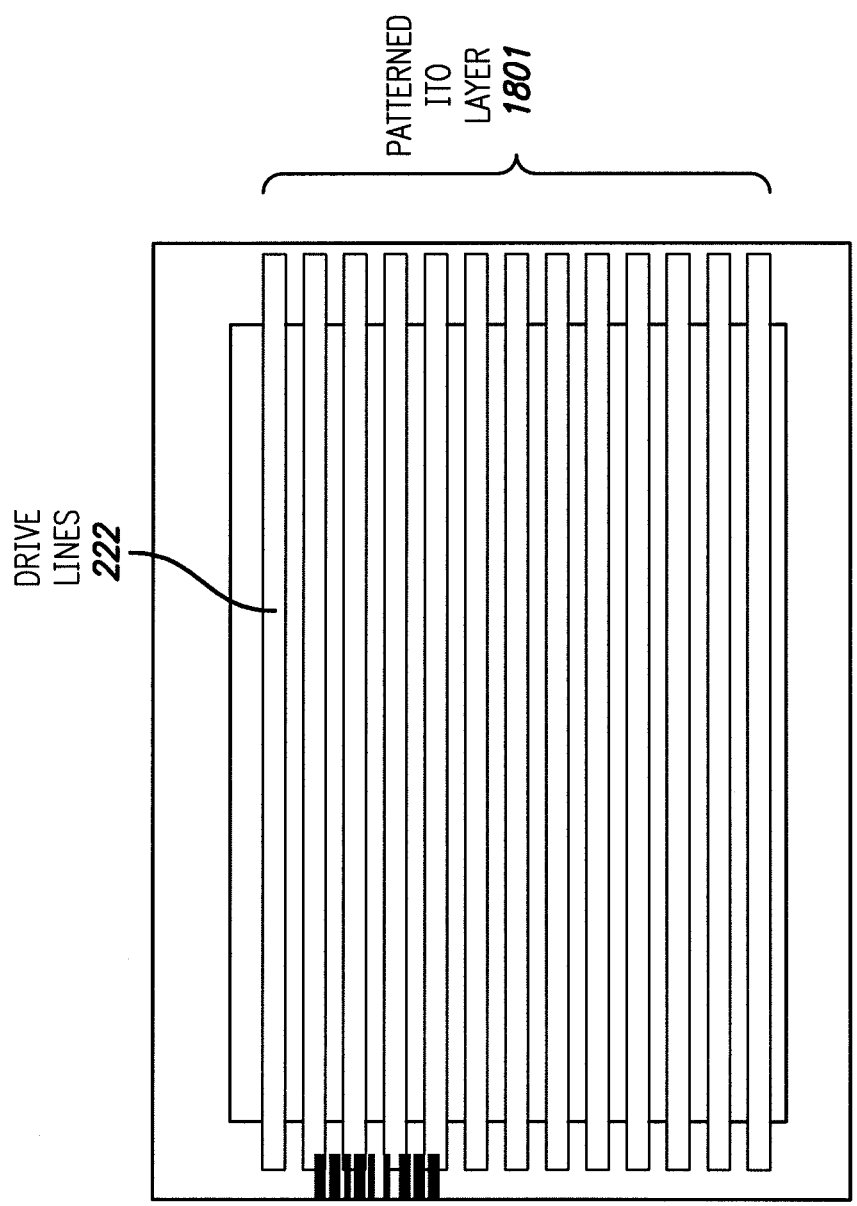

FIGS. 14-18 illustrate another example embodiment in which barrier layer 309 can be formed of low-outgassing organic material. FIGS. 14-15 show patterning of metal layer 305 on glass substrate 303, and the formation of organic layer 307 covering metal layer 305 similar to FIGS. 9-10 of the previous example. FIG. 16 shows barrier layer 309 formed of a low-outgassing organic material. As in the previous examples, barrier layer 309 covers routing/contact area 319 and consequently organic layer 307, while not extending into viewing area 242. FIG. 17 shows formation of ITO layer 311 covering substantially the entire surface of stack up 301. FIG. 18 shows patterned ITO 1801 that may be formed by masking and etching procedures similar to the example embodiments described above. As in the previous embodiments, patterned ITO 1801 can form drive lines 222. Likewise, the processes that may be used to form patterned ITO 1801 do not remove barrier layer 309. Therefore, barrier layer 309 continues to substantially cover organic layer 307.

Figure 19:
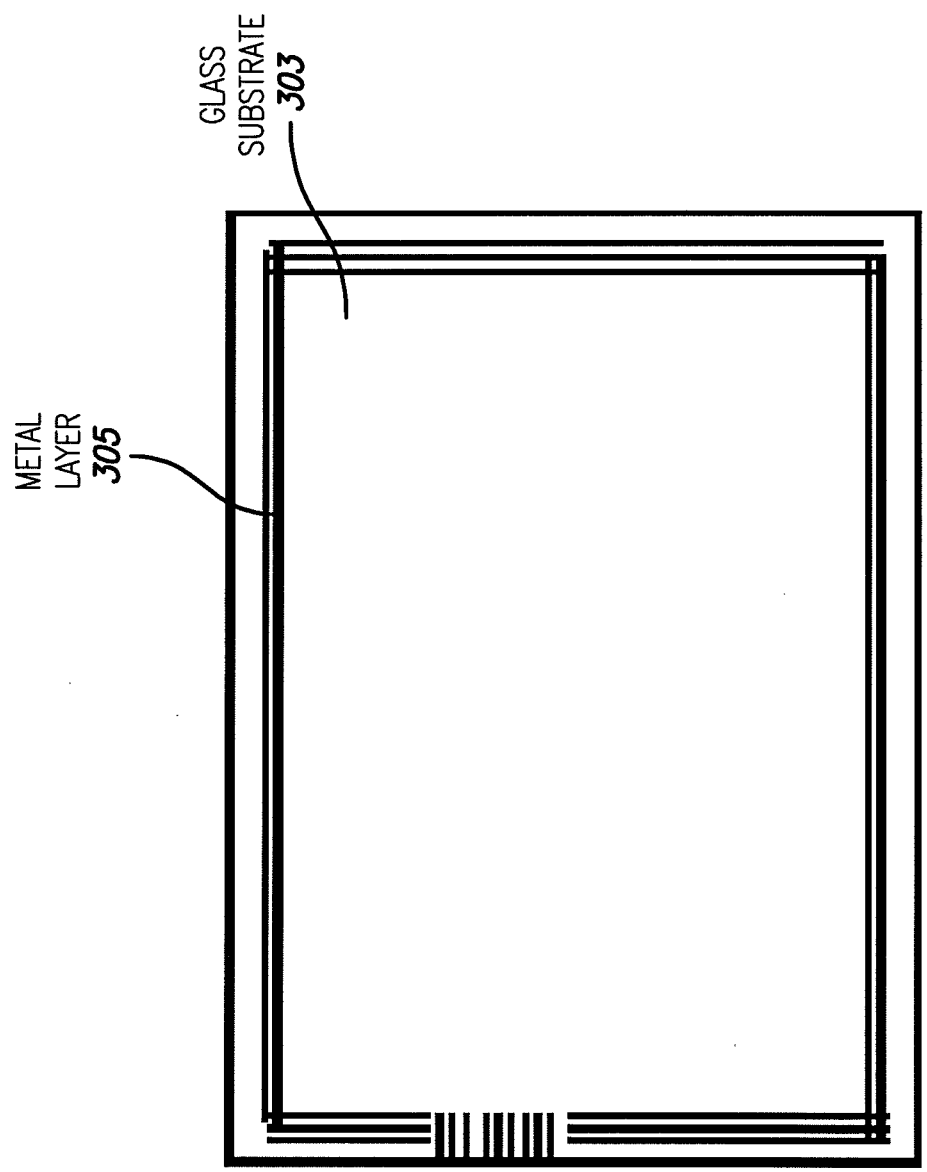
FIGS. 19-23 illustrate another example process of forming a barrier layer according to embodiments of the disclosure.
Figure 20:
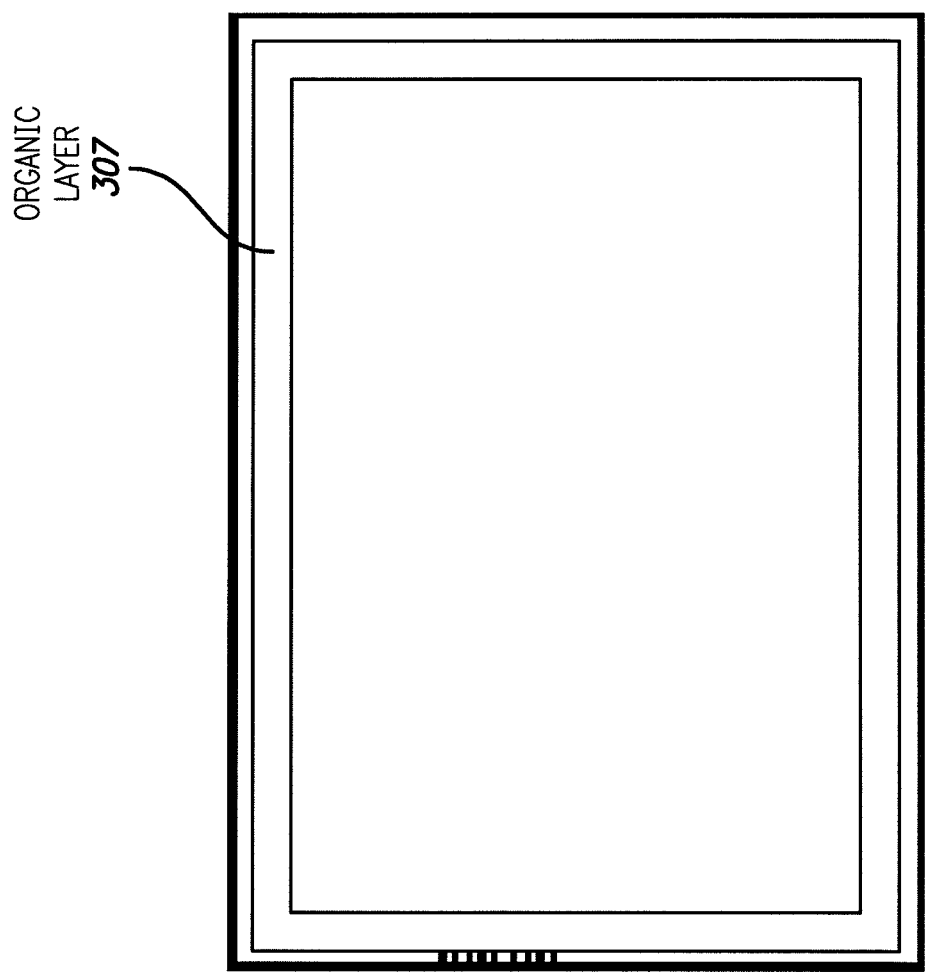
Figure 21:
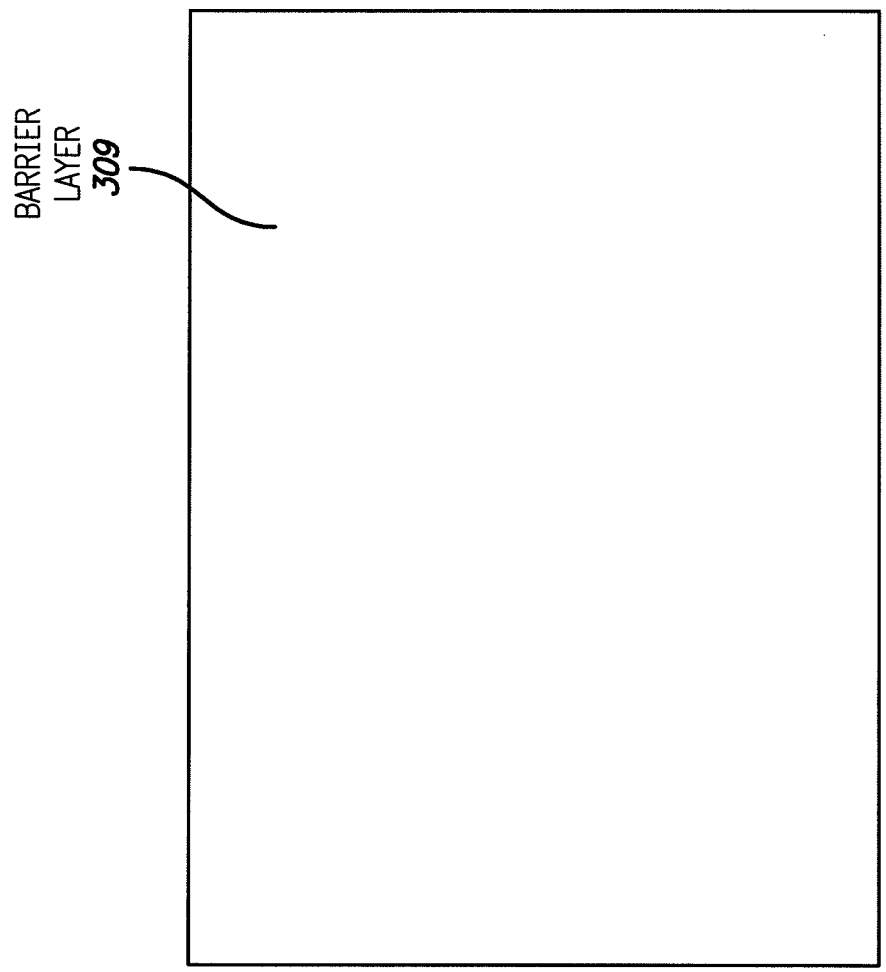

FIGS. 19-23 illustrate another example embodiment in which barrier layer 309 can be formed of a transparent conductor. However, unlike the previous example embodiment shown in FIGS. 4-8, barrier layer 309 of the present embodiment is formed over substantially the entire surface of stack up 301, including viewing area 242. FIGS. 19-20 show patterning of metal layer 305 on glass substrate 303, and the formation of organic layer 307 covering metal layer 305 similar to the previous example embodiments. FIG. 21 shows barrier layer 309 formed of a transparent conductor, such as ITO. Unlike the previous example embodiments, barrier layer 309 can be formed over substantially the entire surface of stackup 301. In other words, the process of forming barrier layer 309 may not include steps to prevent the formation of the barrier layer in certain regions, such as by masking with photoresist, shadow masking, etc., or to remove the barrier layer from certain regions after formation, such as patterning processes that may include masking, etching, etc. Therefore, the present example process of forming a barrier layer may result in fewer steps, which can be more cost effective than some other processes.

Figure 22:
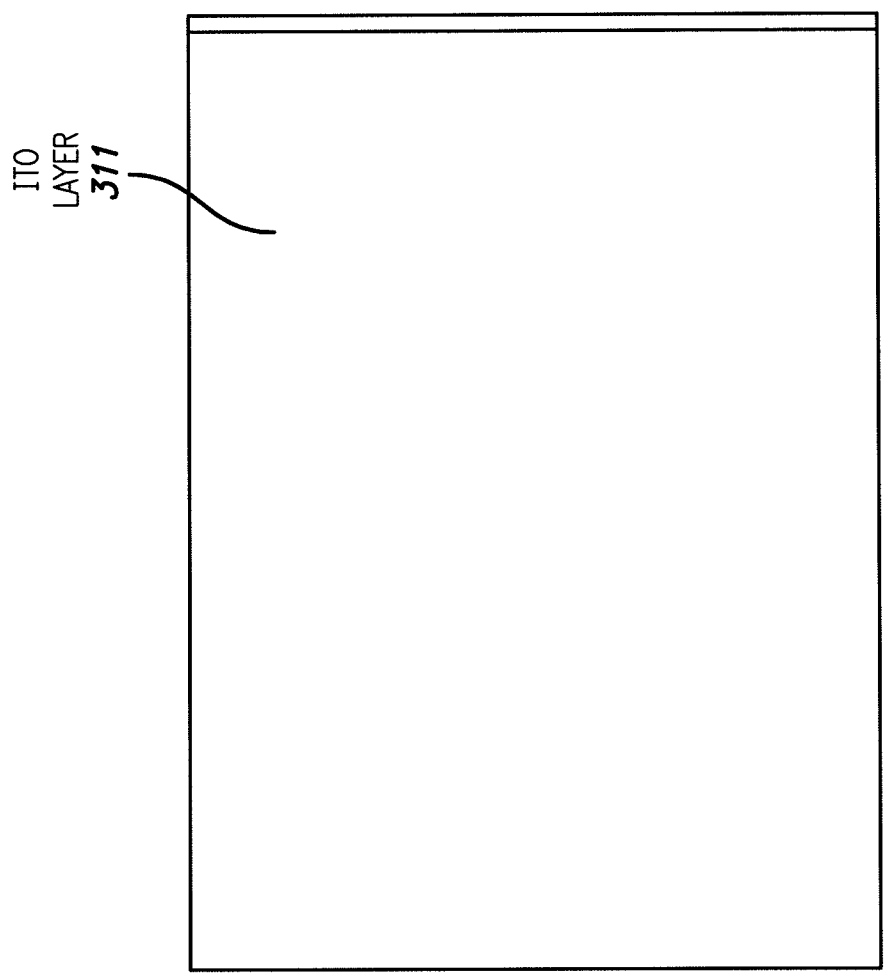

FIG. 22 shows formation of ITO layer 311 covering substantially the entire surface of stack up 301. Similar to previous example embodiments, barrier layer 309 can reduce or prevent outgassing by organic layer 307 from affecting the formation of ITO layer 311, which can allow higher temperatures to be used and can result in high-quality ITO layer 311. However, unlike previous example embodiments, high-quality ITO layer 311 in viewing area 242 is formed over the low-quality ITO of barrier 309.

Figure 23:
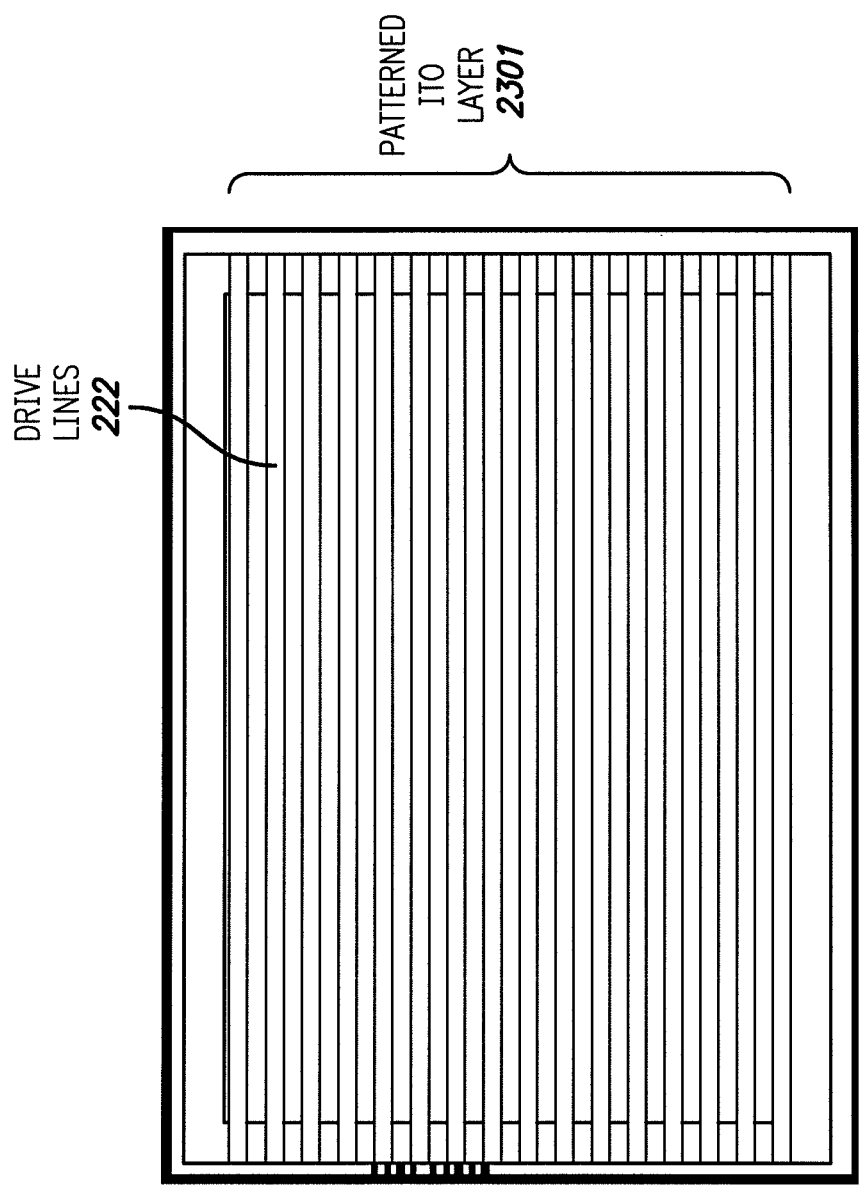

FIG. 23 shows patterned ITO 2401 that may be formed by masking and etching procedures, for example; similar to the example embodiment described above in reference to FIG. 8, the barrier layer 309 and ITO layer 311 can be patterned simultaneously. As in the previous embodiments, patterned ITO 2301 can form drive lines 222. As in the example of FIG. 8, the processes that may be used to form patterned ITO 2301 may also pattern barrier layer 309; however, the processes may need to be adjusted to account for the combination layer of ITO, i.e., the combination of low-quality ITO barrier layer 309 and high-quality ITO layer 311. As described above, some embodiments may include barrier layers of other transparent conductors, e.g., high-quality ITO (within the constraints imposed by outgassing, etc.), conductive transparent oxides (CTO), zinc oxides, titanium oxides, indium zinc oxides, carbon nanotubes, conductive organic polymers, etc.

While various embodiments have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various example embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described example embodiments.

For example, although the embodiments disclosed above illustrate the formation of drive lines, it should be understood that sense lines can be formed in a similar manner. Moreover, embodiments of the disclosure include drive and sense lines formed on different substrates, on opposite sides of the same substrate, or on the same side of a substrate. Furthermore, the drive and sense lines may not be oriented as illustrated in the figures, but may be non-orthogonal and can be shaped as pyramids, diamonds, truncated diamonds, bricks, patches, etc.

Example embodiments are described with reference to a Cartesian coordinate system. However, one skilled in the art will understand that reference to a particular coordinate system is simply for the purpose of clarity, and does not limit the direction of the structures to a particular direction or a particular coordinate system. Furthermore, although specific materials and types of materials may be included in the descriptions of example embodiments, one skilled in the art will understand that other materials that achieve the same function can be used.

What is claimed is:

1. A touch sensor panel stackup comprising:
a first conductive layer;
an organic layer over a first part of the first conductive layer; and
a combination layer over the organic layer, the combination layer including a conductive first sublayer and a conductive second sublayer, wherein the first sublayer is disposed closer to the organic layer than the second sublayer and a property of the first sublayer is different than a property of the second sublayer, the property including at least one of an optical property and an electrical property.

2. The touch sensor panel stackup of claim 1, wherein the first sublayer contacts a second part of the first conductive layer.

3. The touch sensor panel stackup of claim 1, wherein the organic layer contacts the first part of the first conductive layer.

4. The touch sensor panel stackup of claim 1, wherein the first sublayer contacts the organic layer.

5. The touch sensor panel stackup of claim 1, wherein the touch sensor panel stackup is a component of a touch screen having a viewing area and a viewing area border, and wherein
the organic layer is positioned substantially behind the viewing area border, and
the second sublayer extends into the viewing area.

6. The touch sensor panel stackup of claim 5, wherein the first and second sublayers are formed from a single type of conductive material, with the material in each layer having different properties.

7. The touch sensor panel stackup of claim 1, wherein a sheet resistance of the first sublayer is higher than a sheet resistance of the second sublayer.

8. The touch sensor panel stackup of claim 1, wherein a thickness of the first sublayer is higher than a thickness of the second sublayer.

9. The touch sensor panel stackup of claim 5, the touch sensor panel stackup incorporated within a computing system.

10. A mobile telephone including a touch sensor panel stackup comprising:
a first conductive layer;
an organic layer over a first part of the first conductive layer; and
a combination layer over the organic layer, the combination layer including a conductive first sublayer and a conductive second sublayer,
wherein the first sublayer is disposed closer to the organic layer than the second sublayer, and is formed of a lower quality crystalline material than the second sublayer.

11. A digital media player including a touch sensor panel stackup comprising:
a first conductive layer;
an organic layer over a first part of the first conductive layer; and
a combination layer over the organic layer, the combination layer including a conductive first sublayer and a conductive second sublayer, wherein the first sublayer is disposed closer to the organic layer than the second sublayer, and is formed of a lower quality crystalline material than the second sublayer.

* * * * *

UNITED STATES PATENT AND TRADEMARK OFFICE
CERTIFICATE OF CORRECTION

PATENT NO. : 8,956,718 B2
APPLICATION NO. : 12/488432
DATED : February 17, 2015
INVENTOR(S) : Shih Chang Chang et al.

It is certified that error appears in the above-identified patent and that said Letters Patent is hereby corrected as shown below:

In the Claims

At column 9, claim number 1, line number 52 – column 10, line number 6, delete "A touch sensor panel stackup comprising:
 a first conductive layer;
 an organic layer over a first part of the first conductive layer; and
a combination layer over the organic layer, the combination layer including a conductive first sublayer and a conductive second sublayer, wherein the first sublayer is disposed closer to the organic layer than the second sublayer and a property of the first sublayer is different than a property of the second sublayer, the property including at least one of an optical property and an electrical property."

And insert -- A touch sensor panel stackup comprising:
 a first conductive layer;
 an organic layer over a first part of the first conductive layer; and
 a combination layer over the organic layer, the combination layer including a conductive first sublayer and a conductive second sublayer, wherein the first sublayer is disposed closer to the organic layer than the second sublayer and is formed of a lower quality crystalline material than the second sublayer. --

Signed and Sealed this
Ninth Day of June, 2015

Michelle K. Lee
*Director of the United States Patent and Trademark Office*